United States Patent [19]
Stone

[11] 3,800,938
[45] Apr. 2, 1974

[54] CONVEYOR ASSEMBLY WITH EXTRUSIONS HAVING INCLINED CORNERS

[75] Inventor: Guthrie B. Stone, Honeoye, N.Y.

[73] Assignee: Stone Conveyor, Inc., Honeoye, N.Y.

[22] Filed: Aug. 18, 1972

[21] Appl. No.: 281,936

[52] U.S. Cl. ............................................. 198/204
[51] Int. Cl. .......................................... B65g 15/60
[58] Field of Search ............ 198/103, 204, 191, 195

[56] References Cited
UNITED STATES PATENTS

| | | | |
|---|---|---|---|
| 3,605,994 | 9/1971 | Parlette | 198/204 |
| 1,589,091 | 6/1926 | Barber | 198/191 |
| 3,344,906 | 10/1967 | Greitzer | 198/195 |
| 2,430,282 | 11/1947 | Ensinger | 198/191 |
| 2,584,288 | 2/1952 | Przybylski | 198/191 |

Primary Examiner—Richard E. Aegerter
Assistant Examiner—Joseph E. Valenza
Attorney, Agent, or Firm—Clarence A. O'Brien; Harvey B. Jacobson

[57] ABSTRACT

A conveyor assembly comprising an elongated pair of oppositely disposed extrusions with wear strips mounted along their top surfaces to slidably support a conveyor chain, means interconnecting the extrusions and supporting return rollers for the chain, the upper corner portions of each extrusion including an inclined web extending outwardly and downwardly from the wear strip to permit movement of materials between the chain and a transfer disc with its periphery overlying the inclined web.

4 Claims, 7 Drawing Figures

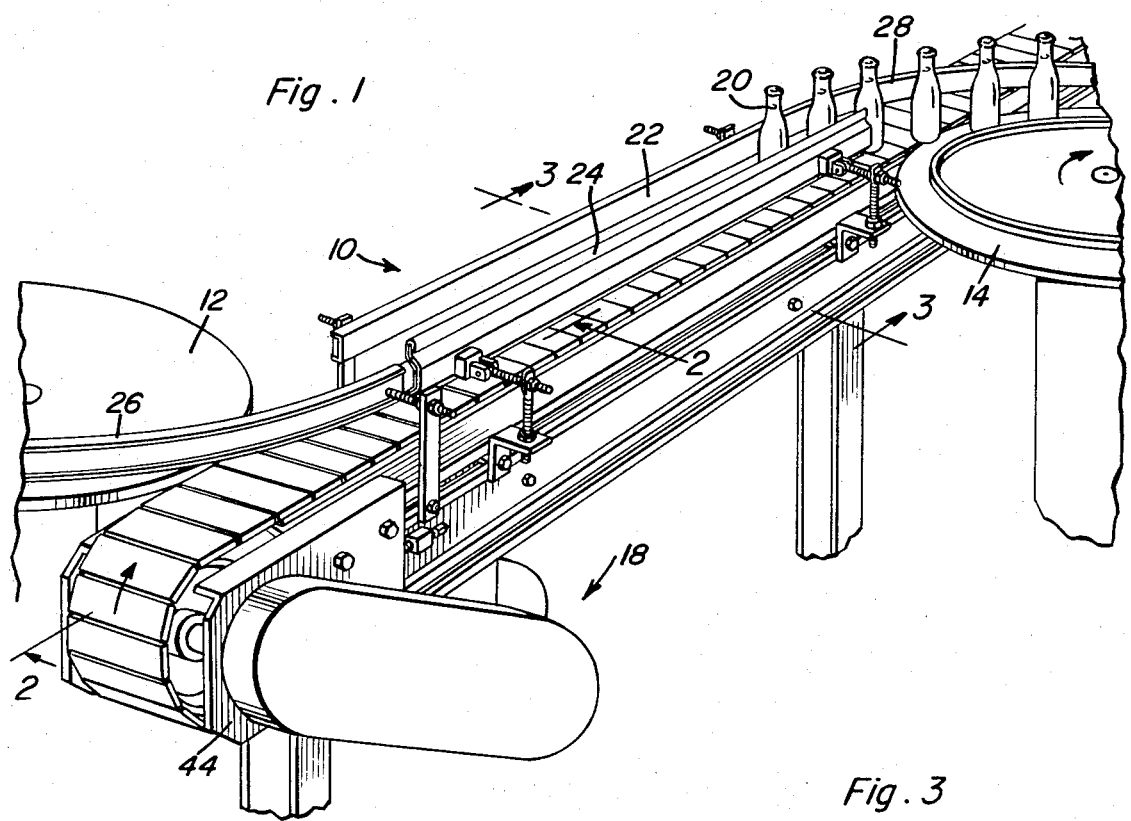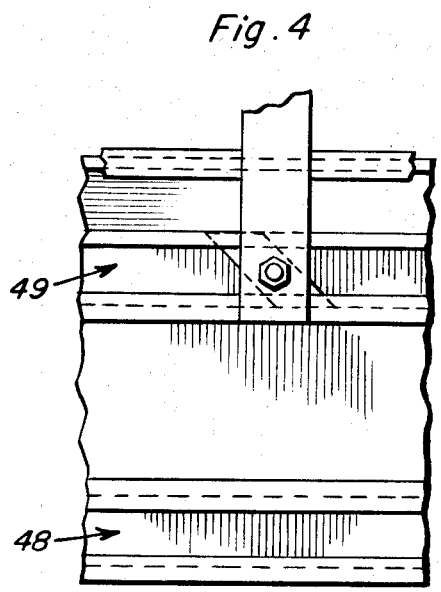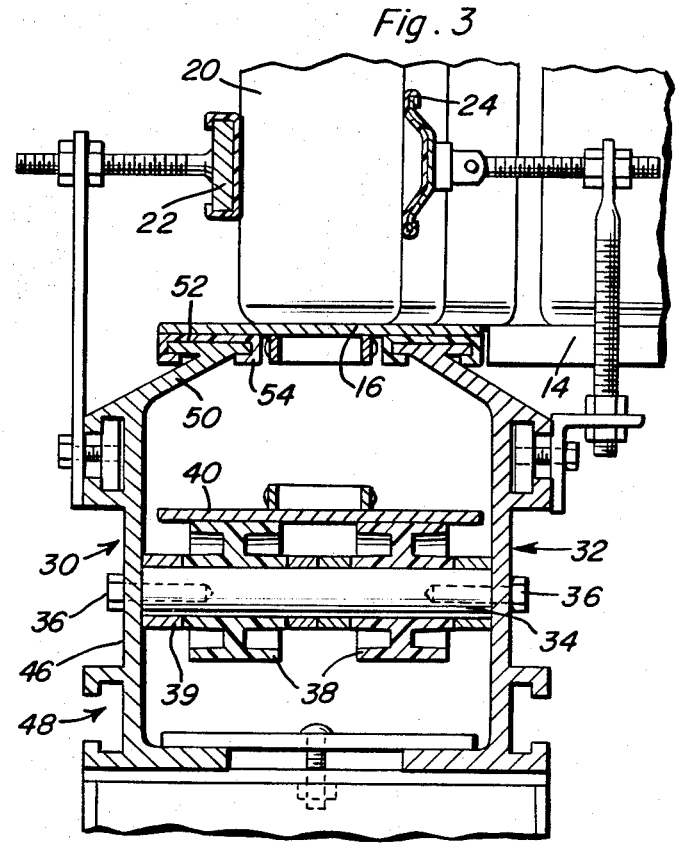

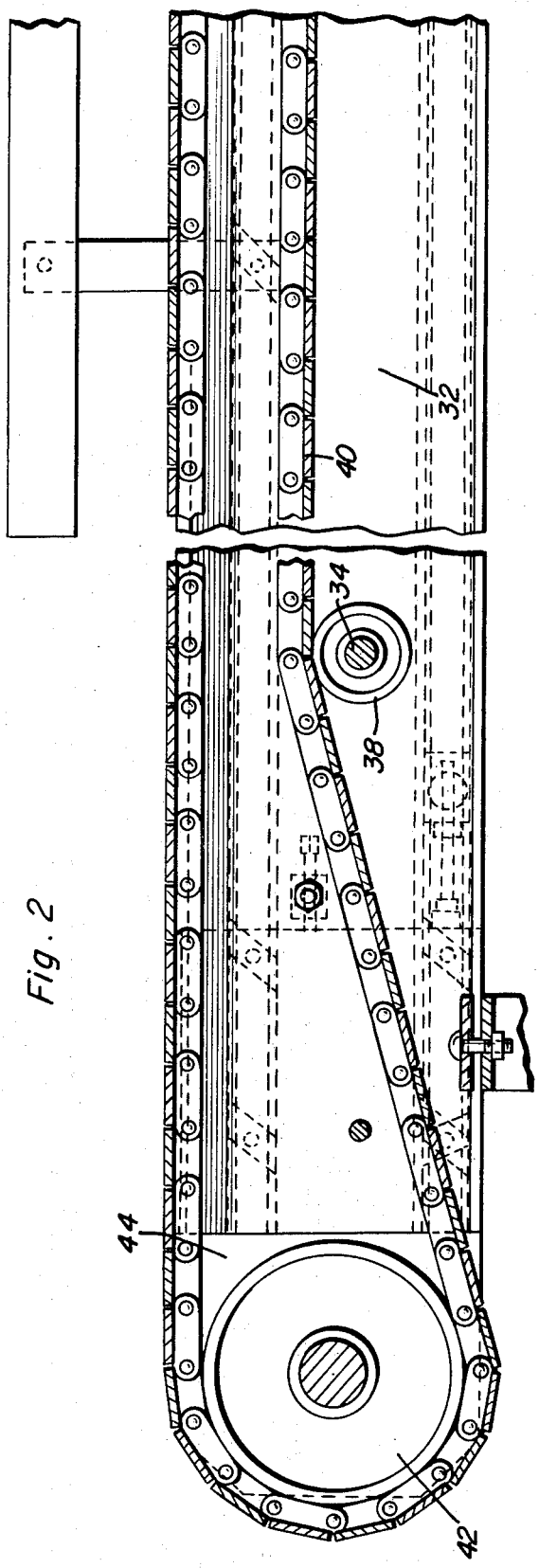
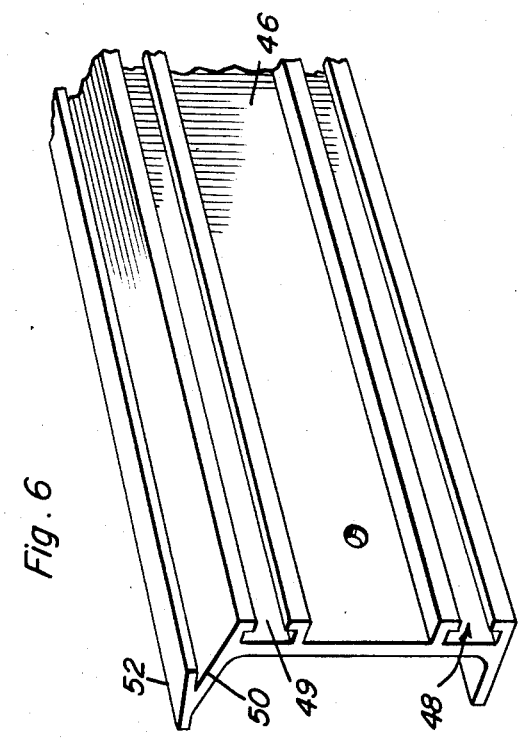
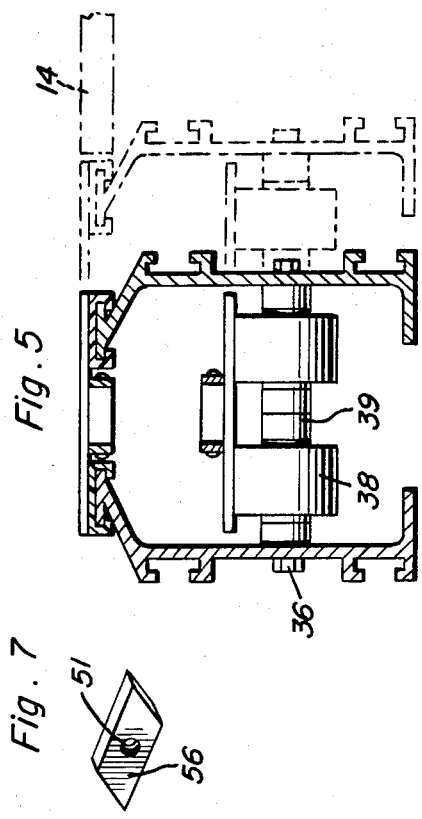
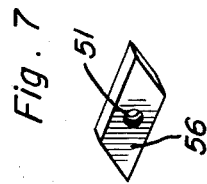

CONVEYOR ASSEMBLY WITH EXTRUSIONS HAVING INCLINED CORNERS

The present invention is generally related to material handling conveyors and, more particularly, to an improved conveyor assembly including extruded frames functionally shaped to allow expeditious transfer of materials and provide shielding for the conveyor return.

In the past, various conveyor assemblies have been provided for handling materials such as beverage bottles and other containers. Many such material handling processes required the transfer of bottles between adjacent conveyors or other pieces of machinery. Most bottles because of their tall shapes are susceptible to easily tipping over. Thus, transfers to and from conveyors have been most often accomplished by transverse movement of the bottles over the side edges of the chain. Heretofore, this was accomplished by specialized conveyor designs for each installation or supplementing standard conveyor assemblies with auxiliary equipment to effect the transfer of materials. Such conventional constructions, for the most part, were either expensive to manufacture, requiring special technical assistance, or did not operate satisfactorily. One such conventional construction utilized a rolled steel channel frame with the edge of the conveyor chain set back from the frame corner. A transfer disc was provided with a very thin edge which rotated closely over the frame corner to effect the material transfer. Due to the closeness of the disc to frame corner, broken glass and other foreign materials often became wedged between the disc and frame corner, requiring periodic shutdown and maintenance.

It is an object of the present invention to provide a novel conveyor assembly for bottles and the like which is economical to manufacture, install, and maintain and includes means for permitting expeditious transfer of materials transversely to and from the moving conveyor member without the use of expensive specialized equipment.

Another object of the present invention is to provide an improved conveyor assembly including a pair of unique extruded frames with inclined upper corner portions extending downwardly and outwardly from the moving conveyor member, whereby adequate clearance is provided to position the edge of a heavy duty transfer disc next to the side of the conveyor member without accumulation of contaminants heretofore requiring periodic shutdown for cleaning and maintenance.

It is a further object of the present invention to provide a versatile conveyor assembly including a pair of spaced, parallel extruded frame members with fastening means therebetween which also serve as mountings for rollers which support the return portion of a moving conveyor chain or the like disposed between the frame members.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a perspective view of the conveyor assembly of the present invention illustrated in a typical container-handling installation utilizing rotary transfer discs.

FIG. 2 is a sectional view taken along section 2—2 of FIG. 1.

FIG. 3 is a sectional view of the conveyor assembly taken along section 3—3 of FIG. 1.

FIG. 4 is a partial side elevation of an extruded frame member associated with the present invention.

FIG. 5 is a sectional view of the conveyor assembly with a phantom view of an alternate spacing arrangement to accommodate a conveyor chain of greater width.

FIG. 6 is a partial perspective view of one of the extruded frame members associated with the present invention.

FIG. 7 is a perspective view of a plate nut associated with the mounting slots of the extrusions of the present invention.

Referring now, more particularly, to FIG. 1 of the drawings, the conveyor assembly of the present invention is generally indicated by the numeral 10 and is illustrated in a typical container handling installation including a pair of transfer discs 12 and 14 mounted on opposite sides of an endless conveyor chain 16 of a conventional type. The chain is advanced by a conventional drive mechanism generally indicated by the numeral 18 to advance bottles 20, or similar materials, between the transfer tables. Preferably, the bottles are embraced by a pair of elongated guide rails 22 and 24 with curved guide rails 26 and 28 being utilized to effect transverse movement of the bottle to and from the conveyor chain.

Of course, it is not intended that the present invention be limited to the installation illustrated in FIG. 1, various conveyor configurations and transfer arrangements may be utilized, if desired. In addition, other moving conveyor members, such as belts, may be utilized with the conveyor assembly, if desired.

Referring to FIGS. 2 and 3, it will be observed that the conveyor assembly is comprised of a pair of oppositely disposed, elongated frame members 30 and 32, preferably of extruded aluminum construction. The frame members are mounted parallel to each other and are interconnected by way of a plurality of shaft members 34 extending transversely between the frame members and held thereto by way of bolts 36 or similar fastening means. Each shaft performs a dual function in that in addition to interconnecting the frame members, it defines an axle for roller members 38 which support a return portion 40 of the conveyor chain. Any number of shafts and rollers may be mounted along the length of the conveyor assembly depending upon the particular requirements of each application.

A conventional drive roller 42 is appropriately supported by bearing bracket members 44 at one end of the extruded frame members. The conveyor chain extends around the drive roller and returns through the space separating the frame members. This provides substantially shielded return of the conveyor chain which enhances the outward appearance and safety of operation of the conveyor assembly.

With particular reference to the extruded frame members best illustrated in FIG. 6, it will be appreciated that each is provided with a substantially vertical side wall 46 with two sets of elongated flanges 48 and 49 on one side which define a pair of "T-slots" or channels. The channels may be utilized to provide support of the conveyor assembly by appropriate mounting means, not illustrated, or to accommodate support brackets for the guide rails and other conveyor related equipment, as illustrated in FIG. 3.

It will be appreciated that each frame member includes an inclined web 50 which is integral with the top of side wall 46 and extends upwardly therefrom on a side opposite channels 48. The frame members are mounted with respect to each other such that the webs extend upwardly toward each other, each web terminating at an elongated, horizontal flange 52 adapted to support the delivery or material handling portion of the conveyor chain. The web and associated support flange 52 extend along the entire length of the extrusion. Wear strips 54, preferably of high molecular weight polyethylene, are mounted over flanges 52 to provide a low friction support surface for the conveyor chain. Each wear strip is formed with a slotted configuration which holds them in place when slipped over the support flanges.

Referring again to FIGS. 1 and 3, it will be observed that the inclined web associated with each frame member provides adequate clearance for the edges of transfer discs 12 and 14, such that they may be positioned immediately adjacent to the edges of the conveyor chain. This provides for easy transfer of containers and other materials between the conveyor and transfer discs with a minimum amount of clearance therebetween. With many conventional constructions, it was necessary to utilize very thin transfer discs which were mounted in extremely close proximity to a flat horizontal corner of a rolled steel channel member. As mentioned above, this resulted in the accumulation of broken glass and other foreign materials requiring periodic shutdown for cleaning and maintenance. Since the webs associated with the frame members of the present invention are inclined, considerable clearance is provided and most contaminants roll off of the web surfaces to provide a form of "self-cleaning." This arrangement significantly reduces the frequency of shutdown and costs of maintenance and cleaning, compared with conventional constructions.

With particular reference to FIG. 5, it will be appreciated that the extruded frame members of the present invention may be assembled together at any desired spacing by providing shaft members 34 of appropriate length and utilizing an appropriate number of rollers 38 and spacers 39. This provides a means by which the standard extrusions may be utilized for accommodating conveyor chains or belts of different width. Existing conveyor assemblies may be easily disassembled and modified to accommodate either larger or smaller chains, if desired. The overall simplicity of the assembly requires that only the extrusions be freed from their main supports and that fastening bolts 36 be removed, substituting shafts and spacers of appropriate dimension.

Referring to FIGS. 4 and 7, it will be observed that the conveyor assembly is provided with unique nut members 56 each of which is in the shape of a parallelogram. Each nut member is of a width approximately the same but not greater than the openings to channels 48 and 49. This provides a convenient means of fastening to the extruded frame members, as the nuts may be inserted at any desired location along the length of the conveyor, without the need for sliding from the ends of the extrusion. Each nut is provided with a threaded aperture 57 which is engaged by an appropriate threaded bolt or fastener, whereby tightening of the fastener is effective to rotate the nut in a clockwise direction into interlocking, retentative engagement with the interior walls of the "T-slot" as best illustrated in FIG. 4. The mounting nuts may be utilized for fastening various support members, such as those associated with the guide rails or for connection to the main support legs for the conveyor assembly. Since two "T-slots" are provided on the outer sides of each extrusion, a wide variety of mounting arrangements may be easily accommodated, during installation.

From the foregoing description, it will be appreciated that the conveyor assembly of the present invention provides a versatile, yet relatively simple conveyor construction which utilizes inexpensive extruded frame members which may be easily cut to the required size either at the factory or at the site of installation. The unique means of fastening the extrusions together provides for shielded return of the conveyor chain and permits simple conversion of the assembly to accommodate chains of different dimension. The configuration of the extruded frame members provides convenient mounting slots and allows for mounting and replacement of the plastic wear strips with a minimum amount of effort.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A conveyor assembly comprising a pair of elongated, spaced, parallel frames, each frame including an upper, longitudinally extending flange, an elongated endless material-handling member including an upper reach supported by said upper flanges for parallel movement relative thereto, each frame including a generally vertical side wall having inner and outer sides, at least one of said frames including an inclined web between the associated upper flange and side wall, said web extending outwardly and downwardly from the upper flange and said conveyor member to provide vertical and horizontal spacing between the conveyor member and side wall for easy transfer of materials to and from the conveyor member along its longitudinal edge adjacent said inclined web, said upper flanges projecting inwardly and outwardly from the upper marginal edges of said webs from which said upper flanges are supported, each of said upper flanges having a channel shaped wear strip engaged thereover from which the opposite marginal portions of said upper reach are slidingly supported, the spacing between the inner sides of said side walls being greater than the width of said conveyor member, said conveyor member including a lower return reach received between said side walls.

2. The structure set forth in claim 1 wherein said conveyor assembly includes fastening means extending transversely between the side walls of said frames.

3. The structure set forth in claim 2 wherein said fastening means includes roller means disposed between said frames supporting said lower return reach of said conveyor member.

4. The combination of claim 1 wherein said side walls include means defining outwardly opening "T" mounting channels extending along the upper marginal edge portions of said side walls, the last mentioned means including downward and outward inclined extension portions of the lower marginal edge portions of said inclined webs projecting outwardly of the outer sides of said side walls, whereby the upper surface portions of said inclined webs define sloped spillage drainage surfaces for said frames as well as said "T" mounting channels.

* * * * *